United States Patent Office 2,870,062
Patented Jan. 20, 1959

2,870,062
GELATIN COMPOSITION FOR CAPSULES

John P. Stanley and Clayton W. Bradley, Detroit, Mich., assignors to R. P. Scherer Corporation, Detroit, Mich., a corporation of Michigan No Drawing. Application April 27, 1956
Serial No. 580,997

6 Claims. (Cl. 167—83)

This invention relates to improved plasticized gelatin compositions for capsules and more particularly to gelatin capsules capable of retaining deliquescent or hygroscopic chemicals which are deleterious to gelatin. Difficulty has been encountered in capsulating chemicals such as liquid non-ionic detergents, salts of strong acids and bases, choline chloride, chloral hydrate and similar materials. These materials tend to attack the gelatin shell and cause it to disintegrate, even when dispersed in oily vehicles, apparently due to the presence of moisture in the gelatin. With so-called "standard" gelatin capsule compositions it is not possible to reduce the moisture to a safe level from the disintegration standpoint, and at the same time be able to form the capsules on continuous capsulating equipment. Standard gelatin compositions are well known and contain, for example, equal parts of water and gelatin and from 15–50% plasticizer on the absolute basis. The hardness of the finished capsules may range from hard to soft in proportion to the plasticizer content. The gelatin from which these standard compositions are prepared normally has a viscosity of from 34–46 millipoises and a Bloom strength of from 135–165 grams. The gelatin is usually made from alkali-treated bone precursor in accordance with the conventional liming process. Such gelatin, having a viscosity of 34 millipoises or above, requires a relatively large proportion of water to render it sufficiently flexible to permit casting the gelatin into sheets and molding capsules from the sheets. As indicated, the presence of such quantities of water apparently promotes a reaction with the hygroscopic chemical content which brings about disintegration of the capsules. The rate of disintegration varies with the nature of the material being capsulated. In some cases the action is so severe that the capsule cannot be formed, but disintegrates during formation. In other cases the disintegration occurs more slowly with the capsule becoming soft and tacky shortly after formation, and finally collapsing. It is suspected that destruction of the capsule is caused by hydrolysis of the wall thereof, although we are not certain as to the exact mechanism of the break down.

Thus, it is the primary object of this invention to provide a gelatin composition for capsules which will not disintegrate in contact with hygroscopic chemicals of the type described and which lends itself to the manufacture of capsules on continuous capsule forming machines.

We have discovered that gelatin capsules having a surprising resistance to hygroscopic chemicals or chemicals that have a hydrolytic effect on standard gelatin compositions can be made from compositions comprising plasticizer, water and a specially-selected low viscosity, high Bloom strength gelatin (as compared with standard viscosity, standard Bloom strength gelatins described above) prepared from acid-treated bone precursor. More specifically, capsule shell compositions capable of withstanding deterioration by solutions or dispersions of hygroscopic chemicals have been prepared from such gelatin having a viscosity within the range of 15 to 30 millipoises, and a Bloom strength of above 125 grams. Preferably, the gelatins suitable for use in our invention have a viscosity of from 24 to 28 millipoises and a Bloom strength of about 250 grams. Gelatins having a viscosity over 30 millipoises require quantities of water which reduce the resistance of the shell to hygroscopic chemicals. Gelatins having a viscosity below 15 are practically glues and are too weak for the preparation of capsules that will be subject to handling. Gelatins of this kind may be compounded with a minimum water content, and surprisingly, provide remarkable resistance to chemicals that attack standard gelatin even in the presence of quantities of moisture that cause disintegration of standard gelatin.

The viscosity figures set out in this specification were all measured on a 6⅔% aqueous solution of gelatin as received (the gelatin as received usually contains a small amount of moisture). The pipette method, which is standard in the industry for measuring viscosity, was used in determining gelatin viscosities set forth herein. The gelatin solution is immersed in a water bath maintained at 60° C.±0.2° C. to bring the solution to this temperature. The time in seconds for 100 cc. of solution to pass through the capillary of the pipette is determined. This figure is inserted in a proper formula obtained by calibrating the pipette to give the viscosity in millipoises.

The Bloom strength is a designation of gel strength and is determined by measuring the weight in grams required to depress a cylindrical foot 12.7 millimeters in diameter to a depth of 4 millimeters in a 6⅔% aqueous solution of gelatin which has been previously chilled for 18 hours at 10° C. This method of determining gel strength is standard in the glue and gelatin industries and is described in detail in Official Methods of Analysis of the Association of Official Agricultural Chemists, seventh edition, page 339 (1950). The apparatus upon which the test is run is known as a Bloom Gelometer.

A representative commercially available gelatin for use in preparing compositions in accordance with this invention is made from bone precursor processed with acid instead of the usual alkali. The process also includes the step of demineralization by contacting the gelatin solution with an ion exchange resin. Such a gelatin should meet the following specifications:

Bloom strength ____ Greater than 225 grams.
Viscosity _____ 26 plus or minus 2 millipoises.
Moisture content __ 12 plus or minus 2%.
pH _____ 5 plus or minus 0.3.
Sulfur dioxide _____ Less than 60 parts per million.
Peroxide _____ Less than 60 parts per million.
Heavy metals _____ Must meet U. S. P. requirements.
Iron _____ Less than 16 parts per million.
Ash [1] _____ Not more than 0.7%.
Mesh size _____ Not more than 5% passing 60 mesh screen.

[1] This ash content is very low as compared with that found in standard gelatin.

The preferred gelatin used in the present invention is unusual in that it has an extremely high Bloom strength coupled with a low viscosity. High Bloom strength gelatins have been produced previously; for example, pigskin gelatin, which is also made by an acid process, has a Bloom strength in the range of 220. However, after preparation of the gelatin composition with the plasticizer at elevated temperatures of, say 170°, the Bloom strength is reduced to approximately 180. Subsequent heating reduces the Bloom strength still further. This is not true of the gelatin used in the present invention.

One important advantage of the present invention is that active ingredients which deteriorate in contact with water may be capsulated in lesser quantities since decomposition caused by hydrolysis is minimized. Where high moisture content is present in the gelatin shell, ingredients whose stability is affected by moisture must be used in quantities in excess of the dosage required because of the deterioration which takes place upon standing.

Another advantage of the present invention lies in the fact that special drying techniques for the capsules may be eliminated, thus saving production time. With standard gelatin the water must be removed from the shell as quickly as possible after capsule formation to prevent deterioration.

The particular plasticizer employed in the compositions of the invention is not critical. Any gelatin plasticizer commonly used in the art is satisfactory, for example, edible polyhydric alcohols such as glycerin, propylene glycol and sorbitol. The plasticizer content determines the resiliency of the finished gelatin capsule and may vary within the range of from 15 to 50% of the total weight of the composition.

In preparing the gelatin compositions, the special low viscosity, high Bloom gelatin is blended with the plasticizer in a suitable mixer to form a plaste. The mixer may be of the Hobart type, the pony type, or any other suitable apparatus adapted to mix powders and liquids to form pasty or viscous masses. Water is then added to the gelatin-plasticizer paste and mixing is continued until a homogeneous fluffy mass is formed. The ratio of water to gelatin by weight may range from 0.6 to 0.85, preferably from 0.7 to 0.74. Generally the lower the water content, the better the finished capsule resists deterioration, but a minimum amount of water is required to provide a flexible gelatin composition that processes readily on the capsulating apparatus. Although the high Bloom gelatin can be processed using less water, it has the unusual property of withstanding deterioration by the chemical content even at water contents higher than the minimum required for processing. Thus, it lends itself well to commercial production.

The percentage of plasticizer is not critical and may vary widely depending upon the hardness desired in the final capsule. However, 15 to 50% plasticizer based upon the total weight of the constituents is a satisfactory range for purposes of this invention. The homogeneous mixture of the three ingredients is transferred from the mixing receptacle to a melter where it is subjected to heat and vacuum until a smooth, fluid, air-free mass is obtained.

Examples of formulations illustrating the invention are set forth in the table below. These formulas are mixed in accordance with the instructions given above. It should be pointed out that the percentages set out for each ingredient are absolute, i. e. the water content is the total amount present including that inherently present in the gelatin (usually about 11%) and in the glycerin (usually about 5%) as well as the amount added as such.

| Example | Percent by weight absolute | | | Hardness Finished Capsule |
|---|---|---|---|---|
| | Gelatin | Glycerin | Water | |
| 1 | 47.6 | 18.1 | 34.3 | hard. |
| 2 | 45.0 | 22.5 | 32.5 | medium hard. |
| 3 | 43.1 | 25.8 | 31.1 | medium. |

Gelatin derived from acid-treated bone precusor, having a viscosity of 26 millipoises and a Bloom strength of 230 grams, was used in the examples above. The gelatin conformed to the detailed specification set forth above.

The above gelatin formulations were formed into chloral hydrate capsules in accordance with the procedure outline below. The capsules were filled with 7.5 minims of chloral hydrate in olive oil (dosage of chloral hydrate equals 0.25 gram). In each case the gel mass processed well and made up into tightly sealed, high strength capsules which remained in good condition after storage. The percentage of defective capsules during manufacture was exceptionally low, being less than ten in a run of more than five thousand. Chloral hydrate is used as an example since it is probably one of the most difficult hygroscopic materials to capsulate.

Capsules of these compositions may be simultaneously formed and filled using a method and apparatus such as that disclosed in Scherer United States Patents Nos. 1,970,396, 2,288,327 and 2,318,718. The gelatin composition is first cast into endless ribbons about .030 inch to .070 inch thick on drums comprising part of the capsulating machine. A pair of such ribbons is advanced continuously along a converging path into juxtaposition between a pair of die rolls, each roll having a plurality of cooperating die cavities adapted to form a spherical shell from the gelatin ribbons about an accurately measured dosage of liquid content which is discharged into the space between the ribbons. Of course, the capsule need not be spherical in shape but may be cylindrical with rounded ends, or ellipsoidal, or any other appropriate rounded shape. The pressure of the delivery of the fluid dosage deforms preselected areas of the ribbons into conformation with the cavities of the dies and the dies apply the pressure required to seal the gelatin at the periphery of the capsule. This capsulating operation is performed without trapping any air within the capsule and without wasting any of the fluid content.

After forming, the capsules may be immersed in acetone, to pre-extract moisture, and then dried by irradiation, while constantly agitating, or in an oven maintained at about 85° F. Such treatment is not necessary, however, and is used only with the most destructive of hygroscopic chemicals.

The gelatin compositions of this invention may be processed on apparatus of this type without changing the equipment or the process in any substantial manner. The gelatin film employed is pliable upon entering the dies and can be readily shaped and sealed in the usual manner.

Hygroscopic materials to be capsulated in the compositions of this invention are conventionally prepared in solution form. For example, in making chloral hydrate capsules, U. S. P. chloral hydrate, which contains about 99.5% $CCl_3CH(OH)_2$, and which may or may not contain a small amount of moisture, is dissolved in an inert oil solvent or other suitable vehicle. The inert solvent must be liquid at room temperature. Suitable vehicles include water-insoluble vegetable oils like peanut, sesame, cottonseed, olive, corn, or a mineral oil, polyethylene glycols, and fatty acid esters of polyethylene glycols. The solution may contain from 50 to 60% of vehicle and, correspondingly, from 50 to 40% chloral hydrate by weight.

The dosage may be varied by regulating the concentration of the chloral hydrate solution and the size of the capsule. Usually capsules range in content from 5 to 10 minims. With the more concentrated solution it is possible to administer the same dosage of chloral hydrate in smaller capsules which is, of course, a decided advantage.

Examples of materials other than those mentioned above which are moisture sensitive or hygroscopic and which may advantageously be capsulated in accordance with this invention are betaine anhydrous, betaine hydrochloride, vitamin and mineral suspensions in water soluble or dispensible vehicles, penicillin, Aerosol OT 100%, and certain low molecular weight alcohols and esters.

This application is a continuation-in-part of our copending application Serial No. 344,898, filed March 26, 1953, now abandoned.

What we claim as new and desire to secure by Letters Patent of the United States is:

1. A composition for encapsulating hygroscopic chemicals comprising gelatin, plasticizer and water, the ratio of water to gelatin ranging from 0.70 to 0.74, said gelatin being prepared from acid-treated bone precursor and having a viscosity of 15 to 30 millipoises and a Bloom strength in excess of 125 grams.

2. The composition of claim 1 wherein said gelatin has a viscosity of 24 to 28 millipoises and a Bloom strength of about 250 grams.

3. The composition of claim 2 wherein the plasticizer is glycerin.

4. A gelatin capsule comprising a hygroscopic chemical dissolved in an inert vehicle and enclosed in a plasticized gelatin shell, said gelatin being prepared from acid-treated bone precursor and having a viscosity of 15 to 30 millipoises and a Bloom strength in excess of 125 grams.

5. A gelatin capsule in accordance with claim 4 wherein the gelatin is plasticized with glycerin.

6. A gelatin capsule comprising a chemical which is deleterious to gelatin in the presence of water, dissolved in an inert vehicle, and enclosed in a plasticized gelatin shell, said gelatin being prepared from acid-treated bone precursor and having a viscosity of 24 to 28 millipoises and a Bloom strength of about 250 grams.

References Cited in the file of this patent

UNITED STATES PATENTS

| 2,467,715 | White | Apr. 19, 1949 |
| 2,585,903 | Meyer | Feb. 19, 1952 |

OTHER REFERENCES

U. S. Dispensatory, 24th ed. (1947), pp. 494–497.